Patented Dec. 16, 1952

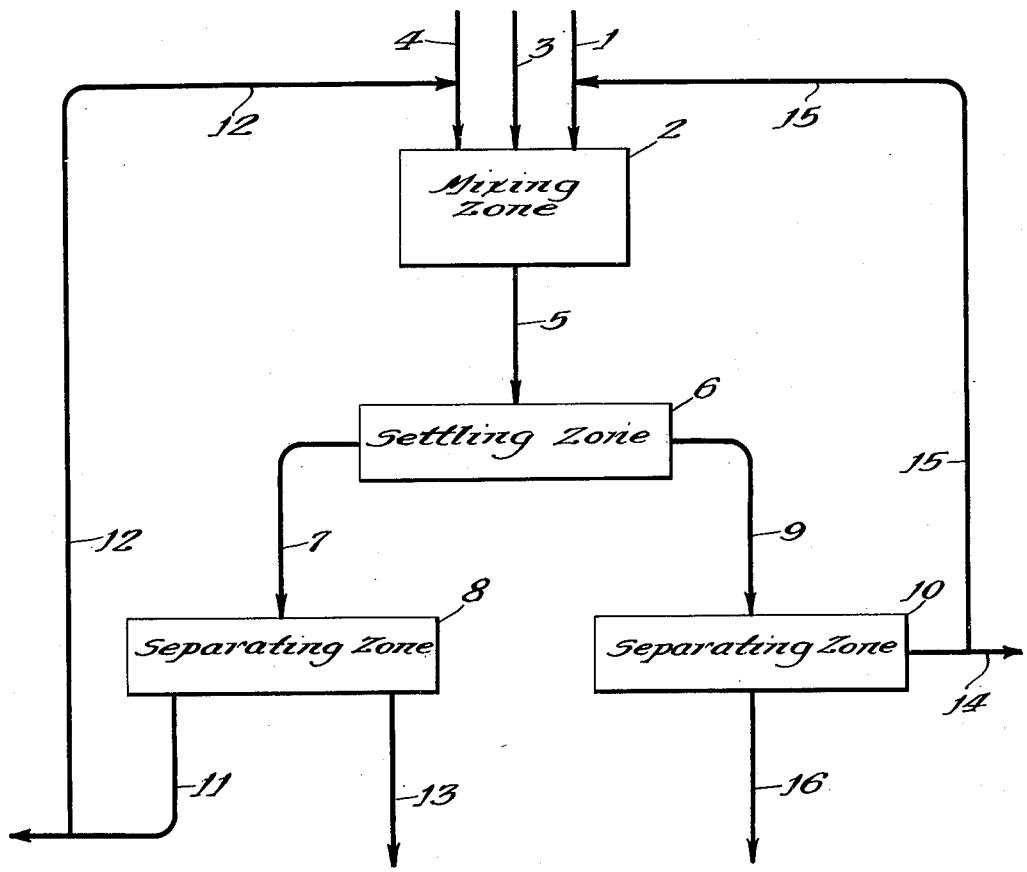

2,622,109

UNITED STATES PATENT OFFICE 2,622,109

PRODUCTION OF DRYING OILS

Herman S. Bloch, Chicago, and Richard C. Wackher, La Grange, Ill., assignors to Universal Oil Products Company, Chicago, Ill., a corporation of Delaware Application May 29, 1948, Serial No. 30,158

10 Claims. (Cl. 260—666)

This invention relates to a process for producing a drying oil by reacting an olefinic hydrocarbon having at least three carbon atoms per molecule with an unsaturated organic compound selected from the members of the group consisting of an olefinic alcohol, thiol, aldehyde, ketone, ester and ether. More particularly, the invention is concerned with the production of a substantially saturated liquid hydrocarbon product and a polyunsaturated drying oil by polymerization and hydrogen transfer reactions of an olefinic hydrocarbon having at least three carbon atoms per molecule with a substituted ethylene compound of the general formula

R—CH=CH—R′ wherein R′ is a member of the group consisting of a hydrogen atom and an alkyl radical, and R is a member of the group consisting of hydroxyalkyl, acyloxy, alkoxy, acyloxymethyl, acyl and mercaptomethyl groups.

One of the objects of this invention is the manufacture of an unsaturated organic material having more than one double bond per molecule and useful in the production of drying oils, resins, and the like.

Another object of this invention is the production of a substantially saturated hydrocarbon product and a polyunsaturated liquid organic material useful as a drying oil.

One specific embodiment of this invention relates to a process for producing a drying oil which comprises reacting an aliphatic olefinic hydrocarbon having at least three carbon atoms per molecule with an olefinic organic compound selected from the members of the group consisting of an olefinic alcohol, an olefinic thiol, an olefinic aldehyde, an olefinic ketone, an olefinic ester, and an olefinic ether in the presence of a conjunct polymerization catalyst until a reaction mixture comprising saturated hydrocarbons and polyunsaturated organic compounds is formed, separating the reaction mixture into a conjunct polymerization catalyst phase and a hydrocarbon phase, separating a saturated hydrocarbon product from the hydrocarbon phase, and recovering from the conjunct polymerization catalyst phase a drying oil having more carbon atoms per molecule than the olefinic hydrocarbon charged.

Another embodiment of this invention relates to a process for producing a drying oil which comprises reacting an olefinic hydrocarbon having at least three carbon atoms per molecule with a substituted ethylene compound of the general formula

R—CH=CH—R′ wherein R′ is a member of the group consisting of a hydrogen atom and an alkyl radical, and R is a member of the group consisting of hydroxyalkyl, acyloxy, alkoxy, acyloxymethyl, acyl and mercaptomethyl groups in the presence of a catalyst comprising essentially hydrofluoric acid until a reaction mixture comprising saturated hydrocarbons and a complex of the catalyst with polyunsaturated organic compounds is formed, separating the reaction mixture into a hydrofluoric acid phase and a hydrocarbon phase, separating a saturated hydrocarbon product from the hydrocarbon phase, and recovering from the acid phase, a drying oil having an average molecular weight and a degree of molar unsaturation greater than that of the olefinic charge stock.

A further embodiment of this invention relates to a process for producing a drying oil which comprises reacting a normally liquid monoolefin with a substituted ethylene compound of the general formula

R—CH=CH—R′ wherein R′ is a member of the group consisting of a hydrogen atom and an alkyl radical, and R is a member of the group consisting of hydroxyalkyl, acyloxy, alkoxy, acyloxymethyl, acyl and mercaptomethyl groups in the presence of a catalyst comprising essentially hydrofluoric acid containing less than about 10% by weight of water until a reaction mixture comprising saturated hydrocarbons and a complex of the catalyst with unsaturated liquid organic compounds is formed, separating the reaction mixture into a hydrofluoric acid phase and a hydrocarbon phase, separating the saturated hyrocarbon products from the hydrocarbon phase, and recovering from the acid phase a drying oil having an average molecular weight greater than that of the normally liquid monoolefinic charge stock.

Monoolefinic hydrocarbons utilizable in the process have at least three carbon atoms per molecule and comprise propylene, the butylenes, pentenes, hexenes, heptenes, octenes, and higher boiling monoolefinic hydrocarbons. A preferred source of such monoolefinic hydrocarbons is polymer gasoline which is formed, for example, by polymerizing propylene and butylenes or mixtures thereof in the presence of solid phosphoric acid catalyst which is a calcined composite of a phosphoric acid and a siliceous carrier such as diatomaceous earth, also called kieselguhr. Fractions of cracked gasoline containing substantial amounts of olefins and relatively small proportions of aromatic hydrocarbons are also suitable charging stocks. These gasoline charging stocks may also contain certain amounts of paraffinic and naphthenic hydrocarbons some of which may be alkylated during the polymerization treatment. C₃ and C₄ fractions recovered from the products of cracking and a C₄ fraction recovered from butane dehydrogenation and containing mainly butylenes and normal butane with relatively little isobutane are also good charging stocks for this process.

This specific invention relates to the conjunct copolymerization of olefinic hydrocarbons with an unsaturated organic compound selected from the members of the group consisting of an olefinic alcohol, olefinic thiol, olefinic aldehyde, olefinic ketone, olefinic ester and olefinic ether. Many of such substituted ethylene compounds have the general formula

wherein R' is a member of the group consisting of a hydrogen atom and an alkyl radical, and R is a member of the group consisting of a hydroxyalkyl, acyloxy, alkoxy, acyloxymethyl, acyl (including formyl) and mercaptomethyl groups. These substituted ethylenic materials include allyl alcohol, vinyl acetate, diallyl phthalate, vinyl butyl ether, methyl vinyl ketone, allyl mercaptan, alpha-terpineol, furfuryl alcohol, furfural, and the like. Thus the group R' may also include a cyclic or a heterocyclic radical. This group comprises mainly those ethylenic compounds of carbon, hydrogen and oxygen in which the carbon atoms bound to oxygen have no more than two valence bonds satisfied by oxygen, derivatives of such compounds, and the sulfur analogs of some of them. The copolymer formed by this process may be varied further by incorporating in the reaction mixture a dienic hydrocarbon such as, for example, butadiene-1,3, isoprene, or cyclopentadiene, and the like, or acetylenic hydrocarbons.

Hydrogen fluoride catalysts employed in this condensation and polymerization process and also referred to as hydrofluoric acid contain a major proportion by weight of hydrogen fluoride and generally at least 90% by weight of hydrogen fluoride and as much as 10% by weight of water, although the titratable acidity of the catalyst layer may be less than 90% because of the presence therein of dissolved hydrocarbons and copolymers including highly unsaturated materials which are described more completely hereinafter. The catalyst preferred in this process is substantially anhydrous hydrogen fluoride, that is, 100% hydrogen fluoride or the commercial grade thereof, which contains 98+% HF.

Other conjunct polymerization catalysts utilizable in the production of drying oils from a sludge containing the same and produced under reaction conditions similar to those employed for the formation of a sludge from a hydrogen fluoride catalyst, include in general, certain acid-acting halides such as aluminum bromide, and aluminum chloride, in their substantially anhydrous forms, sulfuric acid of at least about 85% concentration, boron trifluoride and mixtures of boron trifluoride and hydrogen fluoride. These other acid-acting catalysts form conjunct polymerization products which are structurally and physically similar to the conjunct polymers formed when hydrogen fluoride is utilized as the catalyst herein, but differ chiefly in the manner of recovering the conjunct polymers from sludges containing said catalysts. Because hydrogen fluoride sludges may be decomposed under such conditions that the catalyst may be recovered in a substantially anhydrous condition, suitable for recycling to the sludge-forming stage, hydrogen fluoride is generally preferred in the present process.

The operating temperature used in this process has a profound influence upon the nature of the reaction or reactions occurring when a substituted ethylene compound or its derivative is reacted with an olefinic hydrocarbon having at least three carbon atoms per molecule in the presence of a conjunct polymerization catalyst. Part of this effect of temperature may be due to the behavior of the olefinic hydrocarbons themselves in the presence of the catalyst. Thus while ethylene reacts with hydrogen fluoride to form ethyl fluoride and also certain amounts of polymers at temperatures from about 0° to about 175° C., propylene gives mainly isopropyl fluoride at the lower operating temperatures but yields largely polymers at the higher temperatures of treatment. In contrast to the behavior of ethylene which produces ethyl fluoride as a major product, the monoolefins having at least three carbon atoms per molecule undergo extensive polymerization and condensation with substituted ethylene compounds as herein set forth in the presence of hydrofluoric acid catalyst and with only a small amount of alkyl fluoride formation at temperatures of from about 0° to about 175° C. and preferably at temperatures of from about 10° to about 125° C.

The condensation and polymerization of these olefinic hydrocarbons and substituted ethylene compounds involves more than the simple combination of olefinic molecules to form dimers, trimers, tetramers and higher polymers. It has been observed and these observations have been made the basis of the present process that when a mixture of an olefinic hydrocarbon having at least three carbon atoms per molecule and a substituted ethylene compound of the class herein described is subjected to conjunct co-polymerization in the presence of a conjunct polymerization catalyst, conjunct polymer product is formed in significantly greater yield than in the case of the conjunct polymerization of the monoolefin only. The modified chemical structure of the product (by virtue of the presence of oxygen compounds) markedly affects the drying properties of the material, that is, the modified polymer forms an air-dried film of excellent adherence which dries to a non-tacky, non-brittle film producing the desired properties of such films for drying oil purposes. Further, the presence of an unsaturated alcohol, unsaturated thiol, unsaturated aldehyde, unsaturated ketone, unsaturated ester, or unsaturated ether, in the charging stock, tends to increase the yield of conjunct polymers obtained from a given weight of charging stock mixture and conjunct polymerization catalyst. The latter effect is believed to be due to the increased number of hydrogen acceptors charged to the process.

The complex series of reactions herein referred to in the aggregate as a "conjunct polymerization reaction" comprises an initial polymerization and condensation reaction between the olefinic components of the charging stock and as the reaction progresses further, cyclization and isomerization of the polymers and condensation products occur, accompanied by a hydrogen transfer reaction between the organic compounds or "conjunct polymers" present in the reaction mixture whereby a portion of the conjunct polymers is converted into highly unsaturated organic compounds containing on an average of from about 2.5 to about 4 double bonds per molecule, of which from about 40 to about 70% are conjugated. The resulting unsaturated conjunct polymers, comprising a series of high molecular weight polyolefinic cyclic compounds, become attached by weak chemical bonds to the catalyst to form a sludge-like complex addition product in which the fluorine (in case a hydrogen fluoride catalyst is used) is not, however, organically bound, since it can be substantially all recovered by treatment of the complex with water or with cold aqueous alkali. The saturated hydrocarbon conjunct polymers form an insoluble phase which upon settling of the reaction mixture, separates as a distinct upper layer hereinabove referred to. Since the formation of the unsaturated conjunct polymer is dependent upon the presence of hydrogen acceptors in the reaction mixture, it also follows that the proportion of hydrogen acceptors to hydrogen donors influences the total unsaturation of polyolefinic conjunct polymers formed, as well as their yield from given weights of olefinic hydrocarbon and substituted ethylene compounds charged to the process. The knowledge of the relationship between unsaturation of the hydrocarbon charging stock and the unsaturation of the ultimate drying oil product is embodied in the utilization of an admixture of substituted ethylene and monoolefin hydrocarbons as charging stock in the present process, to obtain conjunct co-polymerization therebetween and to form a greater yield of conjunct polymers having somewhat different chemical structure than a product prepared similarly by conjunct polymerization of a monoolefin hydrocarbon only. The oxygen-modified structures of the conjunct polymers obtained in accordance with the process herein provided are believed to be the basic factors involved in the formation of the more-adherent, more-elastic, and tougher film of drying oil when exposed to atmospheric oxygen.

Study of the ultra-violet and infra-red absorption spectra and other properties of drying oil fractions formed from polymer gasoline and boiling from about 150° to about 200° C., shows that many of these drying oil hydrocarbons are not aromatic but contain a pair of conjugated double bonds with one of these double bonds in a ring of five carbon atoms and the other double bond in an alkenyl side chain. Thus a cyclopentene ring may be combined with a methylene group or a vinyl group. However, some of the drying oil hydrocarbons may also contain a cyclopentadiene ring. The drying oil hydrocarbons which contain a cyclopentenyl ring also contain more than two substituent groups but each of these groups is highly substituted. The higher boiling fractions of this drying oil boiling up to about 450° C. are likewise largely non-aromatic and contain polycyclic hydrocarbons which are generally bicyclic. In both the monocyclic and polycyclic hydrocarbons the five-carbon atom ring portions of the molecules are combined with at least two alkyl groups or two unsaturated aliphatic groups. The data obtained on these fractions indicate that one of the double bonds comprised by the conjugated diene systems of the drying oil is within a five-carbon atom ring and the other double bond is in an alkenyl or alkapolyenyl substituent. Alkapolyenyl groups that may be present are highly branched and contain isolated unsaturation as well as conjugated unsaturation. Some of the typical hydrocarbons contained in the drying oil mixtures so produced from polymer gasoline are represented structurally by the following formula:

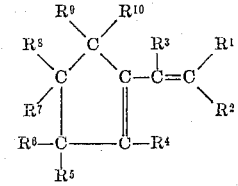

wherein the radicals $R^1$ to $R^{10}$ are selected from the group consisting of hydrogen and alkyl, alkenyl and alkapolyenyl hydrocarbon radicals, at least two of the substituents $R^4$ to $R^{10}$ are hydrocarbon radicals, and not more than two of the groups $R^1$ to $R^4$ represent hydrogen.

Other constituents of the drying oil formed from polymer gasoline are believed to have structures that may be represented by the formula:

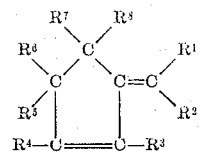

where $R^1$ to $R^8$ represents members of the group consisting of hydrogen and alkyl, alkenyl, and alkapolyenyl hydrocarbon radicals, at least two of the substituents $R^3$ to $R^8$ are hydrocarbon radicals, and not more than two of the substituents $R^1$ to $R^4$ are hydrogen.

The drying oils of the present process contain organic compounds having some of the aforementioned five-carbon atom ring structures condensed with a member of the group consisting of an olefinic alcohol, an olefinic thiol, an olefinic aldehyde, an olefinic ketone, an olefinic ester, and an olefinic ether.

The condensation products which are formed from the olefinic hydrocarbons and substituted ethylene compounds are of higher molecular weight than the olefinic hydrocarbon charging stock and also have good drying oil properties. Such drying oils may be regarded as containing mixtures of condensation products and of higher boiling polymers having a high degree of conjugated and non-conjugated unsaturation. These drying oils have the advantage that many of them form protective films which are less brittle and more durable than those films formed from higher boiling unsaturated oils produced similarly from olefinic hydrocarbons alone without the addition of the substituted ethylene compounds aforementioned.

This process of condensation or co-polymerization for producing drying oils may be modified further by incorporating in the reaction mixture a certain amount of a more unsaturated olefinic hydrocarbon, namely, a dienic hydrocarbon as, for example, butadiene-1,3, isoprene, cyclopentadiene and the like, or an acetylenic hydrocarbon.

The present process consists essentially of contacting an olefinic hydrocarbon and a substituted ethylene compound with hydrofluoric acid catalyst of from about 90 to about 100% concentration at conjunct polymerization conditions, separating the upper saturated hydrocarbon layer from a lower hydrofluoric acid sludge layer, and then decomposing the sludge by water hydrolysis or by heating or other suitable means to recover the drying oil therefrom. Improvement in adherent properties of the drying oil product is observed when about 2 mole per cent of the substituted ethylene compound is present but when more than about an equal molecular proportion of the substituted ethylene compound is reacted with an olefinic hydrocarbon, the amount of condensation and speed of the condensation process are retarded. Accordingly, the molar ratio of olefin having at least three carbon atoms per molecule to substituted ethylene compound will depend upon the properties desired in the product but may vary from about 1 to about 50. The weight ratio of hydrogen fluoride catalyst to organic charging stock, that is, the combined mixture of olefinic hydrocarbon and substituted ethylene compound will vary from about 0.1 to about 10. When the hydrogen fluoride to organic compound weight ratio is less than about 0.1, it is necessary to recycle excessive amounts of organic compounds in order to obtain good conversion, while increase in this ratio above about 10 effects very little further increase in yield of the desired reaction products but such increased ratio of hydrogen fluoride to organic reactants does decrease the capacity of the reactor and other treating equipment.

The present process is carried out at a temperature of from about 0° to about 175° C. and at a pressure sufficient to maintain the reactants and catalyst in substantially liquid phase. The operating pressure is generally from about 1 to about 100 atmospheres. At these reaction conditions, a vigorously agitated mixture of hydrogen fluoride, substituted ethylenic compounds and olefinic hydrocarbon containing at least three carbon atoms per molecule yields a high proportion of catalyst layer containing polyunsaturated organic compounds during a time of from about 1 to about 30 minutes but the reaction may be continued for a longer time to obtain a still better yield of the polyunsaturated organic compounds and a more highly saturated hydrocarbon mixture, which is separated as an upper layer from the hydrofluoric acid catalyst layer.

Olefinic hydrocarbons having more than 3 carbon atoms per molecule are more desirable as charging stocks than propylene because of the increased yields of both saturated and unsaturated liquid products and improved properties of the products obtained from these preferred charging stocks. About the same quantity and quality of drying oil are obtained when charging any of the olefins having from 4 to about 12 carbon atoms per molecule. The different monoolefins having at least four carbon atoms per molecule appear to be mutually interconvertible by polymerization and depolymerization reactions at the conditions specified for this purpose.

It is of particular interest to note that in this type of co-polymerization, in which hydrogen transfer occurs, the product recovered from the sludge or catalyst layer has a higher molecular weight than the charge stock, and is more unsaturated than the charge stock on a molar basis.

It should be noted further that the introduction of polar groups into the polyenic conjunct polymer permits further modification of this product. For example, if an alcohol group is introduced into the molecule by conjunct polymerization, the product may be esterified subsequently with either monobasic or polybasic acids (which may, in turn, be saturated or unsaturated) to make a large variety of esters and polyesters having a wide range of properties, or if acidic groups are introduced into the molecule by conjunct polymerization, the product may be esterified subsequently with either monohydric or polyhydric alcohols, or be reacted with amines, of either saturated or unsaturated type, to make a large variety of esters and amides having a wide range of properties.

In carrying out this process, an olefinic hydrocarbon having at least three carbon atoms per molecule, a substituted ethylene compound, and liquid hydrofluoric acid catalyst are added to a suitable reactor provided with adequate means for agitating the reactor contents and for controlling the temperature therein. Since the condensation, polymerization and copolymerization reactions of this process are exothermic, it is generally necessary to cool the reactor in order to maintain a chosen reaction temperature. The olefinic hydrocarbon, substituted ethylene compound, and hydrogen fluoride catalyst are generally mixed at such rates that substantially all of the organic compounds charged are converted into the saturated hydrocarbon layer and polyunsaturated organic materials contained in the hydrofluoric acid layer. After the desired quantities of organic materials comprising essentially olefinic hydrocarbons and substituted ethylene compounds, have been added to the hydrofluoric acid or after the hydrofluoric acid has been added to the organic materials, the agitation or stirring of the reaction mixture is generally continued for a time sufficient to insure essentially complete conversion of the reactants into saturated hydrocarbons and into polyunsaturated organic liquid having drying oil properties. The agitation or mixing is then stopped and the reaction mixture is permitted to stand whereby it forms two layers: an upper substantially saturated hydrocarbon layer and a lower hydrofluoric acid layer. The substantially saturated hydrocarbon layer is separated from the lower hydrofluoric acid layer comprising essentially hydrogen fluoride combined with polyunsaturated organic material of drying oil properties.

As the saturated hydrocarbons of the upper layer boil over about the same range of temperature as do the unsaturated drying oil constituents recoverable from the hydrogen fluoride lower layer and as small amounts of the saturated hydrocarbons are entrained or mixed with the hydrogen fluoride lower layer, it is advisable to extract the hydrogen fluoride lower layer with a low boiling saturated hydrocarbon, preferably a paraffin having from 3 to about 8 carbon atoms per molecule, before hydrolyzing, or otherwise decomposing, the hydrogen fluoride lower layer to recover the unsaturated drying oil therefrom. From the lower layer, the hydrogen fluoride and drying oil fractions are then separated by suitable means, for example, the lower layer may be added to water or ice whereby the hydrogen fluoride is dissolved in water to form an aqueous solution from which the drying oil separates as an upper layer. Also the lower layer may be subjected to flash distillation to vaporize the hydrogen fluoride from the higher-boiling polyunsaturated drying oil. When the lower layer is separated by distillation methods, the recovered hydrogen fluoride is suitable for recycling to the process to effect reaction of additional quantities of the charged monoolefinic hydrocarbons and oxygenated compound.

The passage of inert gas, such as nitrogen, hydrogen, methane, ethane, carbon dioxide, and the like through the distillation system in which the hydrogen fluoride is being separated, assists in the recovery of the polyunsaturated drying oil. Separation of hydrogen fluoride from the drying oil present in the lower layer is also assisted by carrying out the distillation of said lower layer in a tower containing catalytic packing material formed from graphitized carbon or from a metal selected from the members of the group consisting of aluminum, copper, cobalt, lead, cadmium, and an alloy of copper, such as brass, and preferably in the presence of an inert carrier gas to assist in removing the liberated hydrogen fluoride.

Another method of decomposing the hydrogen fluoride-drying oil mixtures of the lower layer formed by the reaction of hydrogen fluoride with a mixture of olefins and substituted ethylene compounds, is to introduce the lower layer or sludge into an inert liquid, such as a paraffinic hydrocarbon, contained in a decomposition zone and maintained at a temperature near its boiling point. The decomposition zone or reactor tower may contain a catalytic packing material in the liquid zone of this reactor tower and an inert gas may also be passed therethrough. Hydrogen fluoride so liberated is vaporized, condensed, and conducted to storage while the inert liquid containing the dissolved, highly unsaturated drying oil is withdrawn from the decomposition zone, either intermittently or continuously, and replaced by fresh liquid. This liquid should be readily separable from the drying oil dissolved therein and it should also be relatively inert to the hydrogen fluoride sludge and to the products of the decomposition of the sludge. If a paraffinic naphtha is employed, its normal boiling point should be from about 100° to about 150° C. so that it may be separated by fractional distillation from the drying oil which boils generally from about 150° to above 450° C.

One method of carrying out the process of this invention is illustrated diagrammatically by Figure 1 which is a flow diagram indicating the various steps of the process. According to the method illustrated, an olefin-containing feed stock, such as a butane-butylene or pentane-pentene mixture, is directed through line 1 to mixing zone 2 to which a substituted ethylene compound is directed through line 3 and hydrofluoric acid of 90 to 100% hydrogen fluoride concentration is introduced through line 4. Mixing zone 2 comprises a coil, an agitated reaction zone, or other mixing equipment preferably provided with suitable temperature control means, such as, for example, a cooling or heating jacket or a cooling or heating coil in order to maintain the reaction mixture at a chosen temperature within the limits of from about 0° to about 175° C. The reaction mixture present in mixing zone 2 may also contain recovered hydrogen fluoride and a low boiling saturated hydrocarbon which are separated from the final reaction products and recycled through lines 12 and 15 respectively, to lines 1 and 4 as hereinafter described. The olefin-containing feed stock, substituted ethylene compound and hydrogen fluoride are contacted in mixing zone 2 for a time sufficient to convert substantially all of the olefin monomer and substituted ethylene compounds into condensation products and polymers and also to effect hydrogen transfer reactions between various polymers and condensation products so as to produce a substantially saturated hydrocarbon product and a polyunsaturated product, the latter being associated with the liquid hydrogen fluoride catalyst.

From mixing zone 2, the resultant mixture is directed through line 5 to settling zone 6 wherein the mixture or emulsion of organic compounds and liquid hydrofluoric acid is permitted to stand and to separate into an upper hydrocarbon layer and a lower hydrofluoric acid catalyst layer. From settling zone 6, the hydrofluoric acid catalyst layer is withdrawn through line 7 to catalyst layer separating zone 8 while a substantially saturated hydrocarbon material which separates as an upper layer in zone 6 is directed therefrom through line 9 to hydrocarbon layer separating zone 10.

The hydrogen fluoride catalyst layer in separating zone 8 is subjected to flash distillation, to separate hydrogen fluoride from polyunsaturated organic material, comprising drying oil materials. The used hydrogen fluoride so separated in zone 8 is directed therefrom through line 11 and at least a portion thereof is directed through recycle line 12 to line 4, and thence to mixing zone 2 already mentioned, while the polyunsaturated liquid drying oil material is discharged from separating zone 8 through line 13 to storage or to further purification or fractionation not illustrated in Figure 1.

The hydrocarbon layer so separated from used hydrogen fluoride catalyst in settling zone 6 is subjected to suitable fractionation in hydrocarbon separating zone 10. Fractional distillation of the hydrocarbonaceous material present in zone 10 separates therefrom, as an overhead fraction, a mixture of residual dissolved hydrogen fluoride and substantially saturated low boiling hydrocarbons introduced to the process in the olefin-containing charging stock, or made during the conversion process. Thus when charging a butane-butylene fraction, the hydrocarbon stream being directed from separating zone 10 through line 14 is mainly normal butane while this stream is mainly normal pentane when a pentane-pentene mixture is charged to mixing zone 2. If desired, a portion of the low boiling saturated hydrocarbon fraction which is discharged through line 14 may be directed therefrom through recycle line 15 to line 1, already mentioned, through which the olefin-containing feed stock is directed to the process. After removal of the low boiling saturated hydrocarbons in hydrocarbon separating zone 10, a substantially saturated hydrocarbon product formed by the condensation, polymerization and hydrogen transfer reactions is directed from zone 10 through line 16 to storage or to use not illustrated in the diagrammatic drawing.

When the olefinic charging stock does not contain a substantial proportion of saturated hydrocarbons having from 3 to about 8 carbon atoms per molecule, it is advisable to extract the hydrofluoric acid layer with such a solvent before separating the drying oil from the hydrofluoric acid layer in separating zone 8.

The following examples are given to illustrate the process of this invention although the data introduced should not be construed to limit unduly the broad scope of the invention.

EXAMPLE I

Several runs were made in which a polymer gasoline was reacted with a substituted ethylene compound in the presence of liquid hydrogen fluoride catalyst. These runs were carried out in a turbomixer autoclave of one liter capacity and the resultant hydrogen fluoride sludge was decomposed by water hydrolysis. The polymer gasoline employed in these runs had a bromine number of 132, a calculated molecular weight of 105, a specific gravity ($d_4^{20}$) of 0.712 and the following Engler distillation characteristics:

| IBP, °F. | 10% | 30% | 50% | 70% | 90% | E. P. | Percent over |
|---|---|---|---|---|---|---|---|
| 83 | 140 | 206 | 231 | 276 | 383 | 436 | 94.5 |

This polymer gasoline was reacted with allyl alcohol, diallyl phthalate, and vinyl acetate as indicated in Table 1 which also gives some of the properties of the upper layer and lower layer products.

TABLE 1

*Reaction of polymer gasoline with allyl alcohol, vinyl acetate, and diallyl phthalate respectively in the presence of hydrogen fluoride*

| Run No. | 1 | 2 | 3 |
|---|---|---|---|
| Reaction Temp., °C | 90–95 | 90–95 | 90–95 |
| Reaction Time, Hours | 1 | 1 | 1 |
| Maximum Pressure, p. s. i. | | 114 | 112 |
| Charge, gms.: | | | |
|   Allyl Alcohol | 12 | 0 | 0 |
|   Diallyl Phthalate | 0 | 0 | 54 |
|   Vinyl Acetate | 0 | 21 | 0 |
|   Polymer Gasoline | 185 | 185 | 185 |
|   Anhydrous HF | 220 | 180 | 190 |
| Recovered, gms.: | | | |
|   Upper Layer | 95.3 | 84 | 97 |
|   Lower Layer | 296 | 283 | 330 |
| Lower Layer Products, after hydrolysis, gm | 79.3 | 91.6 | 105 |
| Lower Layer Products, after hydrolysis, percent of organic charge | 40 | 44 | 44 |
| Properties of Products: | | | |
| Upper Layer— | | | |
|   Bromine No | 0.5 | 3 | 1 |
|   Specific Dispersion | 104 | 104 | 83 |
| Lower Layer Product— | | | |
|   Bromine No | 183 | 179 | 141 |
|   Maleic Anhydride Value | 69 | 75 | 68 |
|   Molecular Weight | 255 | 257 | 302 |
|   Specific Dispersion | | 137 | 140 |
|   Carbon, percent | 86.52 | 86.64 | 86.32 |
|   Hydrogen, percent | 12.33 | 12.60 | 12.09 |
|   Oxygen (by diff.) percent | 1.15 | 0.76 | 1.59 |
|   Viscosity (poises) | Less than 5 | Less than 5 | Less than 5 |
|   Percent Boiling Above 345° C | 36.7 | a 22.8 | b 72.4 |
|   Percent Co-polymerization (from carbon and hydrogen analysis) | 30 | 9 | 12 | a Above 360° C.
b Above 325° C.

In the run made with polymer gasoline and allyl alcohol, the organic unsaturated product gives negative tests with acetyl chloride showing the absence of hydroxyl groups. Carbon and hydrogen analysis showed the presence of 1.15% oxygen (approximately 30% of that charged) in the hydrolyzed lower layer product. It is considered probable that high molecular weight ethers were formed. The oil recovered from the hydrofluoric acid layer dried on exposure to air in a thin film to a hard, adherent coating.

In the run made with polymer gasoline and vinyl acetate, conjunct co-polymerization occurred with the separation of an upper hydrocarbon layer and a lower hydrofluoric acid layer. The unsaturated organic material obtained by hydrolyzing the hydrofluoric acid layer indicated, by carbon and hydrogen analysis, that only 0.9% oxygen was present, corresponding to about 9% of that charged in vinyl acetate. Although the yield of lower layer product based on total charging stock was 44% and accordingly somewhat higher than the 35–40% yield generally obtained from polymer gasoline alone, the higher yield probably resulted from the action of vinyl acetate as a hydrogen acceptor thereby allowing more polymerization of the olefin monomer. Vinyl acetate did not appear in the upper layer as the upper layer material was saturated and contained no oxygen based on carbon and hydrogen analysis. It appears that much of the vinyl acetate (or material derived from it) remained in the lower layer coordinated with hydrogen fluoride and was then washed out during the hydrolysis and washing procedure. A film of the drying oil obtained from the lower layer product dried hard and showed good adherence to metals.

When polymer gasoline and diallyl phthalate were reacted in the presence of liquid hydrogen fluoride, conjunct polymerization was obtained with formation of a saturated upper layer and a lower hydrofluoric acid layer. Hydrolysis of the lower hydrofluoric acid layer caused a separation of a solid at the interface of the oil and water layers. This solid was separately recovered and washed with n-pentane in which it was insoluble. The acidity determination (572) showed it to be roughly equivalent to that for phthalic acid (675) while carbon and hydrogen analysis gave results very close to those for phthalic acid. The percentage of oxygen by difference represented 81% of the oxygen charged in the charging stock while the calculations of the 30 grams of solid as phthalic acid showed that it represented 82% of the diallyl phthalate. It appears that anhydrous hydrogen fluoride caused a splitting of the ester to set free the phthalic acid. Acetyl chloride tests on both the upper layer and lower layer liquid showed the absence of alcohol groups. Carbon and hydrogen analysis on the upper layer and lower layer liquid showed the presence of oxygen in each of these products. About 7% of the charged oxygen was found in the upper layer and 11.9% was found in the lower layer organic material which together with the 81% found in the solid represented 99.9% of that charged.

The lower layer liquid product was somewhat similar in bromine number and maleic anhydride value to that produced from polymer gasoline alone, but was somewhat higher in molecular weight indicating some conjunct co-polymerization. The lower layer liquid product was subjected to a drying test with the result that a test film dried readily to a hard, adherent film which eventually became slightly brittle.

EXAMPLE II

A sample of terpineol was redistilled to give a fraction boiling at 136° C. at a pressure of 61 mm. of mercury and having a refractive index $n_D^{20}$ of 1.4820, a specific dispersion of 104, and a specific gravity ($d_4^{20}$) of 0.9367.

In a run employing this material, 35 grams of alpha-terpineol, 185 grams of polymer gasoline, and 185 grams of anhydrous hydrogen fluoride were reacted in a turbomixer autoclave of one liter capacity at a temperature of 90–95° C., for one hour at a maximum pressure of 120 pounds per square inch. The resultant reaction product was then separated into 286 grams of a lower hydrofluoric acid layer and 102.5 grams of an upper layer. The upper layer and pentane extract of the lower hydrofluoric acid layer after washing with water yielded 106 grams of hydrocarbons. The lower hydrofluoric acid layer after hydrolysis with water and washing yielded 94.5 grams of unsaturated organic liquid which represented 43% by weight of the total polymer gasoline and terpineol charged. Conjunct polymerization was obtained as evidenced by the formation of a saturated upper layer and an unsaturated lower layer product. Carbon and hydrogen analysis of the lower layer product showed an oxygen content of 0.5% which represented 13% of that charged. This low percentage of oxygen indicates substantially complete dehydration of terpineol during the treatment with hydrofluoric acid. However, as in the case of similar treatment of a mixture of limonene, (dipentene) and polymer gasoline with hydrogen fluoride, the chief evidence of co-polymerization is in the greater yield of product which also may result from the functioning of alpha-terpineol as a hydrogen acceptor. On the basis of the drying oil yield obtainable from polymer gasoline alone, the present yield may represent some 80% co-polymerization. Drying tests on the organic product recovered from the lower layer both with and without driers, show that the product dried readily to a hard finish but that the finish eventually became slightly brittle.

EXAMPLE III

In this run, 24 grams of furfural, 185 grams of polymer gasoline, and 177 grams of anhydrous hydrogen fluoride were contacted in the turbomixer autoclave of one liter capacity at a temperature of 90–95° C. and at a maximum pressure of 120 pounds per square inch. At the end of this treatment, the contents of the turbomixer were transferred to a copper flask, and the upper and lower layers were then separated by decantation and pentane extraction. The upper layer product, after the pentane was distilled therefrom, was recovered as a saturated hydrocarbon mixture which indicated that conjunct polymerization had occurred.

The lower layer after hydrolysis with ice and water yielded a liquid and a solid, both insoluble in the aqueous hydrogen fluoride. The solid was only slightly soluble in pentane and was separated from the liquid by filtering and washing with pentane. The solid which was isolated contained oxygen in an amount equal to 39% by weight of that charged in the original furfural while the amount found in the liquid product represented 20% by weight of that charged. This latter value is believed to represent the amount of co-polymerization in the liquid product although the actual amount may be greater in view of the numerous ways in which the furfural may be dehydrated.

Drying oil tests on the organic material obtained by hydrolyzing the used hydrofluoric acid layer showed that a test film of the liquid product dried readily to a hard finish.

EXAMPLE IV

Furfuryl alcohol and polymer gasoline were reacted in the presence of anhydrous hydrofluoric acid followed the procedure employed in Example III. Conjunct polymerization occurred but it was necessary to separate the upper saturated layer by pentane extraction from the hydrofluoric acid lower layer. Hydrolysis of the hydrofluoric acid lower layer yielded a solid and a liquid, the former consisting principally of polymers formed from dehydrated furfuryl alcohol and the liquid consisting essentially of a drying oil material formed from the polymer gasoline commingled with at least 5% of a co-polymer formed from polymer gasoline and furfuryl alcohol. A test film of the liquid drying oil product formed in this run dried readily to a hard, adherent finish.

EXAMPLE V

A mixture comprising 25 grams of vinyl-n-butyl ether and 185 grams of polymer gasoline was contacted with 207 grams of anhydrous hydrogen fluoride in a turbomixer autoclave at 90–95° C. for one hour. The product, after settling, comprised 97.5 grams of upper layer (which, after washing, proved to have a bromine number of 1), and 311 grams of acid phase. From the latter was recovered after pentane extraction and hydrolysis, 96 grams of organic drying oil containing 0.92% oxygen (approximately 22% of that charged as the vinyl ether) and having the following other properties:

| | |
|---|---|
| Bromine number | 165 |
| Maleic anhydride value | 79 |
| Molecular weight | 228 |
| Refractive index ($n_D^{20}$) | 1.4781 |
| Color (Gardner) | 14 |

This oil, when exposed in a thin film with added metal driers, dried to a hard film in one day. The dried film was flexible an non-brittle after six weeks of exposure.

Valuable material useful in the preparation of drying oils, resins, and other chemical products may be formed by the conjunct co-polymerization of substituted ethylene compounds of the type hereinabove described in the absence of olefinic hydrocarbons.

We claim as our invention:

1. The process for producing a drying oil which comprises mixing from about 0.1 to about 10 parts by weight of hydrofluoric acid of from about 90 to about 100% by weight hydrogen fluoride concentration and one part by weight of a mixture consisting essentially of from about 1 to about 50 molar proportions of a monoolefinic hydrocarbon having at least three carbon atoms per molecule and one molar proportion of an olefinic organic compound selected from the members of the group consisting of an olefinic alcohol, an olefinic thiol, an olefinic aldehyde, an olefinic ketone, an olefinic ester, and an olefinic ether at a temperature of from about 0° to about 175° C. and at a pressure of from about 1 to about 100 atmospheres, agitating the reaction mixture for a time sufficient to form polymerization and condensation products and to effect hydrogen exchange to form a reaction mixture containing a substantially saturated hydrocarbon product and hydrofluoric acid containing a polyunsaturated drying oil, separating the reaction mixture into a hydrocarbon layer and a hydrofluoric acid layer, recovering a drying oil from the hydrofluoric acid layer, and recovering a substantially saturated hydrocarbon product from the hydrocarbon layer.

2. The process defined in claim 1 further characterized in that the charged monoolefin is a normally liquid olefin.

3. The process for producing a drying oil which comprises mixing from about 0.1 to about 10 parts by weight of hydrofluoric acid of from about 90 to about 100% by weight hydrogen fluoride concentration and one part by weight of a mixture consisting essentially of from about 1 to about 50 molar proportions of a monoolefinic hydrocarbon having at least 3 carbon atoms per molecule and one molar proportion of an olefinic alcohol at a temperature of from about 0° to about 175° C. and at a pressure of from about 1 to about 100 atmospheres, agitating the reaction mixture for a time sufficient to form polymerization and condensation products and to effect hydrogen exchange to form a reaction mixture containing a substantially saturated hydrocarbon product and hydrofluoric acid containing a polyunsaturated drying oil, separating the reaction mixture into a hydrocarbon layer and a hydrofluoric acid layer, recovering a drying oil from the hydrofluoric acid layer, and recovering a substantially saturated hydrocarbon product from the hydrocarbon layer.

4. The process for producing a drying oil which comprises mixing from about 0.1 to about 10 parts by weight of hydrofluoric acid of from about 90 to about 100% by weight hydrogen fluoride concentration and one part by weight of a mixture consisting essentially of from about 1 to about 50 molar proportions of a monoolefinic hydrocarbon having at least 3 carbon atoms per molecule and one molar proportion of allyl alcohol at a temperature of from about 0° to about 175° C. and at a pressure of from about 1 to about 100 atmospheres, agitatnig the reaction mixture for a time sufficient to form polymerization and condensation products and to effect hydrogen exchange to form a reaction mixture containing a substantially saturated hydrocarbon product and hydrofluoric acid containing a polyunsaturated drying oil, separating the reaction mixture into a hydrocarbon layer and a hydrofluoric acid layer, recovering a drying oil from the hydrofluoric acid layer, and recovering a substantially saturated hydrocarbon product from the hydrocarbon layer.

5. The process for producing a drying oil which comprises mixing from about 0.1 to about 10 parts by weight of hydrofluoric acid of from about 90 to about 100% by weight hydrogen fluoride concentration and one part by weight of a mixture consisting essentially of from about 1 to about 50 molar proportions of a monoolefinic hydrocarbon having at least 3 carbon atoms per molecule and one molar proportion of alpha-terpineol at a temperature of from about 0° to about 175° C. and at a pressure of from about 1 to about 100 atmospheres, agitating the reaction mixture for a time sufficient to form polymerization and condensation products and to effect hydrogen exchange to form a reaction mixture containing a substantially saturated hydrocarbon product and hydrofluoric acid containing a polyunsaturated drying oil, separating the reaction mixture into a hydrocarbon layer and a hydrofluoric acid layer, recovering a drying oil from the hydrofluoric acid layer, and recovering a substantially saturated hydrocarbon product from the hydrocarbon layer.

6. The process for producing a drying oil which comprises mixing from about 0.1 to about 10 parts by weight of hydrofluoric acid of from about 90 to about 100% by weight hydrogen fluoride concentration and one part by weight of a mixture consising essentially of from about 1 to about 50 molar proportions of a mono-olefinic hydrocarbon having at least 3 carbon atoms per molecule and one molar proportion of a vinyl-alkylether at a temperature of from about 0° to about 175° C. and at a pressure of from about 1 to about 100 atmospheres, agitating the reaction mixture for a time sufficient to form polymerization and condensation products and to effect hydrogen exchange to form a reaction mixture containing a substantially saturated hydrocarbon product and hydrofluoric acid containing a polyunsaturated drying oil, separating the reaction mixture into a hydrocarbon layer and a hydrofluoric acid layer, recovering a drying oil from the hydrofluoric acid layer, and recovering a substantially saturated hydrocarbon product from the hydrocarbon layer.

7. The process for producing a drying oil which comprises mixing from about 0.1 to about 10 parts by weight of hydrofluoric acid of from about 90 to about 100% by weight hydrogen fluoride concentration and one part by weight of a mixture consisting essentially of from about 1 to about 50 molar proportions of a mono-olefinic hydrocarbon having at least 3 carbon atoms per molecule and one molar proportion of vinyl-n-butylether at a temperature of from about 0° to about 175° C. and at a pressure of from about 1 to about 100 atmospheres, agitating the reaction mixture for a time sufficient to form polymerization and condensation products and to effect hydrogen exchange to form a reaction mixture containing a substantially saturated hydrocarbon product and hydrofluoric acid containing a polyunsaturated drying oil, separating the reaction mixture into a hydrocarbon layer and a hydrofluoric acid layer, recovering a drying oil from the hydrofluoric acid layer, and recovering a substantially saturated hydrocarbon product from the hydrocarbon layer.

8. The process of claim 1 further characterized in that said mono-olefinic hydrocarbon is proplyene.

9. The process of claim 1 further characterized in that said mono-olefinic hydrocarbon is butylene.

10. The process of claim 1 further characterized in that said mono-olefinic hydrocarbon contains from about 5 to about 12 carbon atoms per molecule.

HERMAN S. BLOCH.
RICHARD C. WACKHER.

REFERENCES CITED

The following references are of record in the file of this patent:

UNITED STATES PATENTS

| Number | Name | Date |
|---|---|---|
| 1,256,535 | Dyer | Feb. 19, 1918 |
| 2,252,333 | Rothrock | Aug. 12, 1941 |
| 2,253,232 | Chirstman | Aug. 19, 1941 |
| 2,400,521 | Kuhn | May 21, 1946 |
| 2,440,459 | Bloch | Apr. 27, 1948 |
| 2,440,477 | Johnstone | Apr. 27, 1948 |
| 2,448,987 | Langkammerer | Sept. 7, 1948 |